United States Patent
Welches et al.

(10) Patent No.: US 6,654,261 B2
(45) Date of Patent: Nov. 25, 2003

(54) INVERTER DC LINK VOLTS "TOOTH" MODULATION SCHEME

(75) Inventors: Richard Shaun Welches, Amherst, NH (US); Richard E Griessel, Derry, NH (US); Peter Beckedahl, Nashua, NH (US); Karl Bond, Hudson, NH (US)

(73) Assignee: Youtility, INC, Hudson, NH (US)

( * ) Notice: Subject to any disclaimer, the term of this patent is extended or adjusted under 35 U.S.C. 154(b) by 36 days.

(21) Appl. No.: 10/052,802

(22) Filed: Oct. 29, 2001

(65) Prior Publication Data

US 2003/0012038 A1 Jan. 16, 2003

Related U.S. Application Data

(60) Provisional application No. 60/244,090, filed on Oct. 27, 2000.

(51) Int. Cl.[7] ............................ H02M 1/12; H02M 1/14
(52) U.S. Cl. .................... 363/41; 363/160; 363/131; 363/135
(58) Field of Search ................ 363/41, 42, 17, 363/98, 131, 132, 135, 160

(56) References Cited

U.S. PATENT DOCUMENTS

| | | | |
|---|---|---|---|
| 4,387,421 A | * | 6/1983 | Zach et al. .................... 700/28 |
| 4,641,232 A | | 2/1987 | Pitel |
| 4,757,434 A | * | 7/1988 | Kawabata et al. ............. 363/41 |
| 4,800,478 A | * | 1/1989 | Takahashi .................... 363/41 |
| 4,935,859 A | | 6/1990 | Kirchberg et al. |
| 4,935,860 A | | 6/1990 | Kirchberg et al. |
| 4,937,720 A | | 6/1990 | Kirchberg |
| 4,942,511 A | | 7/1990 | Lipo et al. |
| 4,965,709 A | | 10/1990 | Ngo |
| 5,465,011 A | | 11/1995 | Miller et al. |
| 5,559,685 A | | 9/1996 | Lauw et al. |
| 5,592,371 A | | 1/1997 | Rajashekara et al. |
| 5,841,644 A | | 11/1998 | Lipo et al. |
| 6,275,392 B1 | | 8/2001 | Streicher et al. |

OTHER PUBLICATIONS

PCT International Search Report dated Jun. 5, 2002 of International Application No. PCT/US01/51248 filed Oct. 29, 2001.

* cited by examiner

*Primary Examiner*—Bao Q. Vu
(74) *Attorney, Agent, or Firm*—Maine & Asmus

(57) ABSTRACT

The invention in the simplest form is a power conditioning and inverting system for improved and efficient power generation. In particular, the present invention is a modulated dc link scheme that dramatically reduces the switching frequency ripple across the PWM output filter inductor and provides cost, size, and weight reductions, as well as efficiency enhancements. In a preferred embodiment of the present invention, the DC-DC converter control takes a feedback signal proportional to the inverter output voltage. This feedback is "summed" into the primary DC-DC volts command thereby causing the dc bus/link voltage to vary at a multiple of the output fundamental frequency causing the DC link to become a signal at a fundamental frequency voltage with a dc offset. The tooth modulator DC supply tracks the AC output voltage, reducing the difference between the applied DC volts and the AC output volts, thereby reducing inductor core losses.

17 Claims, 15 Drawing Sheets

INVERTER DC LINK VOLTS "TOOTH" MODULATION SCHEME

CROSS REFERENCE TO RELATED APPLICATIONS

This application claims priority under 35 U.S.C. Section 119 from a U.S. Provisional Patent Application serial No. 60/244,090 filed on Oct. 27, 2000, which is incorporated herein by reference for all purposes.

BACKGROUND OF THE INVENTION

1. Field of the Invention

The present invention relates to power distribution, more specifically, to power regulation and conditioning.

2. Background Art

In the current power environment, power plants are interconnected to loads via utility grids to deliver large amounts of power. Efficient distribution over long distances power is delivered as low frequency three phase AC current. However, low frequency AC current is not suitable for end use at some loads. Therefore, prior to the end use, the utility grid power has to be converted to a more useable form. A typical power "conditioning" configuration includes an AC-to-DC rectifier that converts the utility AC power to DC across positive and negative DC buses, across a DC link, and an inverter linked to the DC link that converts the DC power back to three phase AC power having an end useable form, namely three phase high frequency quality AC voltage. A controller controls the inverter to provide the voltage waveforms required by the load.

Besides power plants connected to a grid, local power systems can be interconnected to the grid. And, backup power supplies provide power to the local load when utility grid power is cut off. In the distributed grid, the local power system transfers power to the grid or takes power from the grid as needed. There are many forms of local power systems such as fuel cells and microturbines, each having particular requirements and operating parameters. Thus, there are many applications for an efficient power conditioning unit that can generate the proper power to the load with minimal distortion.

Typical DC-DC voltage regulators are well-known in the art, and they primarily provide a constant DC voltage to an inverter which then pulse width modulates (PWM's) the DC voltage to produce an AC output voltage. PWM inverters and various techniques that convert DC to AC are also well known in the art. A PWM pattern is generally a set of switching transients that is applied to the DC signal via an inverter and produces a sinusoidal AC signal.

The combination of an inverter stage connecting to the DC-DC converter is also commonplace, and the inverter converts the cleaned DC output of the converter into an AC output of the inverter.

As recognized in the industry, there are many limitations in the existing designs and considerable room for improvement. For example, the systems have difficulty addressing unbalanced load conditions, there are problems with ripple frequencies that require expensive and large inductors and capacitors. There have been various attempts in the prior art to regulate the AC output signal and reduce distortions and ripple on the AC output. Typically these attempts measured the voltage and current of the AC signal and changed the PWM switching patterns to minimize distortions.

In a typical application, the DC-DC converter conditions and regulates power from an regulated DC source and tries to produce a tightly regulated DC output voltage for use by a PWM output inverter. In a 240/120VAC 60 Hz application, the output power (or DC current) as seen by the dc link occurs at a 120 Hz frequency. Typically an output PWM filter is used to filter off the PWM inverter "switching ripple" thereby producing a "clean" sinusoidal output. Voltage and consequently power loss developed across the PWM filter inductor increases as a function of the difference between the DC link volts and the output AC voltage. The greater the difference between the DC links voltage and the output voltage, the more extreme the voltage levels across the output filter components.

U.S. Pat. Nos. 4,935,859 and 4,935,860 describe a VCSF system that has an inverter that applies a PWM pattern of switching transients to the DC signal to produce an AC signal. A feedback circuit reduces short duration switching transients in the PWM pattern by analytically determining DC link distortion. These patents relate to methods for reducing insulated gate bipolar transistor (IGBT) short pulses by modulating the DC link. A related patent, U.S. Pat. No. 4,937,720, is for a DC link harmonic elimination for AC inverters.

There are other inventions intended to reduce semiconductor switching losses with a variety of soft switch techniques, such as U.S. Pat. Nos. 5,559,685, 5,592,371 and 5,841,644. While these various schemes have certain advantages, they are not intended nor allow for reducing filter inductor losses.

Besides utility and local power conditioning, there are many other applications for power conditioning such as uninterruptible power supplies (UPS), that benefit from more efficient conditioning.

What is needed is a system that can reduce the voltage or switching ripple across the PWM output filter inductor. For safety purposes, the system should also provide fast circuit breaking in fault conditions. Such a system should also allow for lower cost, lighter weight and more efficient PCU systems.

SUMMARY OF THE INVENTION

The present invention has been made in consideration of the aforementioned background. One object of the invention is a modulated dc link scheme for dramatically reducing the switching frequency ripple developed across the PWM output filter inductor.

Another object of the invention is to allow greater overall power conditioning unit (PCU) inverter efficiency because of the reduced PWM filter inductor losses, without any loss of AC output waveform dynamic performance. Typically a voltage "feed forward" term from the dc volts feedback to the PWM controlling DSP can allow for stable inverter control.

A further benefit is that lower cost PWM filter inductor core materials may be used as the core losses are primarily driven by the high frequency ripple content of the PWM output. Inductor size and weight may also be reduced.

During excessive overloads such as occur during a circuit breaker protected branch short circuit where, the power conditioning inverter is required to feed energy into the fault to cause the protection circuit breaker to trip. Utilizing the dc modulation scheme of the present invention automatically reduces the DC link voltage to track the output AC volts. When the load impedance is very small, or shorted, the output AC volts is consequently reduced to limit output current. The output inverter provides more energy faster into the fault to clear the circuit breaker. This is primarily because the inverter switch losses are reduced (reduced VDC), and the filter inductor magnetic core normally absorbs a large percentage of the total output power during an overload fault.

Further passive component cost reductions, and lifetime enhancements can be realized with this dc link modulation scheme. For example DC link bulk capacitance can be reduced as the required energy storage is reduced, thereby allowing for smaller and less expensive capacitors. PWM filter costs (capacitors and inductors) are also reduced. And, the longevity and stability of the system is enhanced by avoiding excessive power handling primarily due to undesirable switching ripple.

Electromagnetic interference (EMI) is also reduced as the PWM output voltage ripple, and therefore higher frequency harmonics (up into the RF range), are dramatically reduced. This allows the output EMI/RF filter to be more efficiently designed, while achieving similar EMI performance. Conversely, a high quality RE/EMI filter may be retained thereby providing significant EMI/RF emissions reductions. In certain applications that require low noise emissions, such as military applications, the present scheme has particular applicability.

The dc modulation scheme allows very efficient power conditioning at a lower cost, particularly when using of a high frequency transformer (20–50 kHz) in the main DC/DC converter. High-frequency links have rapidly become the preferred technology in grid-connected, photovoltaic inverter applications, and have the advantage of providing dc isolation and inversion without the need of 60 Hz transformer. As a result, the designs are smaller and lighter, and advantages are further described in U.S. Pat. No. 4,641,232.

In one embodiment of the present invention, the system uses a MOSFET based H-bridge topology. The high frequency transformer, cost, size, weight are dramatically reduced as compared to a 60 Hz transformer. The high frequency transformer provides isolation, and allows for a voltage transform (from 48Vdc to 400 VDC, etc.).

The dc modulation scheme of the present invention can also be used to provide AC-AC transformations even with a 1:1 turns ratio in order to provide isolation only, thereby reducing transformer cost, size etc. This has vast applications in avionics, space, and other applications where size and weight limitations are critical.

The preferred embodiment of the present invention is in DC-DC-AC inverters, or power conditioner units (PCU's). However, the present invention also allows use in AC-DC-AC inverters, for power conditioning or motor controllers. These inverters can be used in residential, commercial, and even industrial applications. Although most beneficial in single/2phase power generator or motor systems (such as in appliance single phase motors). Additional benefits are also achieved in 3-phase or poly-phase power systems.

Although this dc link modulation scheme benefits 3 phase inverters, the most substantial benefits are realized with single/2 phase three wire power inverters, such as are normally required for residential power generation systems. This is because the single/2 phase (120 Volt L-N, 240 Volt L-L) output power is produced at a 2× fundamental frequency rate, or 120 Hz, wherein the fundamental frequency is 60 Hz.

In a normal 3-phase system, each phase voltage is 120 degrees phase shifted, whereas the residential voltages are 180 degrees phase shifted. Therefore, in residential power generators/inverters the DC link current can be seen to contain a large magnitude of 120 Hz.

There are several basic embodiments to tooth modulator equipped three phase inverters. In a first embodiment, each phase is equipped with a separate DC supply (tooth modulator). In this case, each individual phase PWM inverter may consist of a single ½ bridge, or preferably an H-bridge.

A second embodiment is where all three PWM phases are fed from a common DC supply consisting of two series connected tooth modulators. In this case, each tooth modulators controls ½ of the DC link voltage supplied to the inverter switches. The upper DC supply, or top, tooth modulator will track the sum of the positive ½ of the three phase voltages line to neutral. The lower DC supply, or bottom, tooth modulator will track the sum of the negative ½ of the three phase voltages line to neutral. Each tooth modulator thereby supplies a DC with either 300 Hz, or 360 Hz content.

Switched voltages applied across the output PWM inductor increase as a function of the difference between the applied DC link volts and the output AC voltage. Consequently power losses developed in the PWM inductor peak near the zero crossing of the output AC sinusoidal voltage. The tooth modulator derived DC supply tracks the AC output voltage, reducing the difference between the applied DC volts and the AC output volts, thereby reducing inductor core losses.

It is also within the scope of the invention and contemplated by the inventors to use the modulated DC link volts to feed a thyristor type inverter, as opposed to an IGBT based output inverter. This allows further cost reduction while not compromising too much on the power quality. In another embodiment, three phase inverters (commonly fed from a single dc link) are fed from different, independently controlled dc links that allow use of IGBT, or even thyristor based output inverters. This has enormous benefits for higher powered fuel cell fed power conditioning inverter systems.

Without a load present, the dc modulation scheme regulates the output volts to a fixed dc volts, and under no-load conditions there would be virtually no PWM filter losses. This approach is consistent with a "sleep-mode" where the PCU output, under no-load conditions, allows the AC output to dwell at a low DC voltage (~5–10% of nominal AC rating). When a load is applied, the PCU detects the resulting current output (or the collapse of the applied DC volts) and then goes on line and begins to produce the nominal regulated AC output voltages. In certain application some limited output load may be required.

Some phase shift between the VAC out feedback and the response of the H-bridge (DC-DC converter) may occur, but this is corrected with appropriate control loop design commonly known in the art, for example, adding phase lead network to the feedback amplifier.

There is much interest industry wide in efficiency enhancement technologies for use in power inverters. Those interested in this technology include fuel cell power systems developers (mostly residential), power supply manufacturers, diesel and microturbine generators, makers of Uninterruptible Power Supplies (UPS), and essentially any application that requires electrical conversion.

One object of the invention is a dc links tooth modulator for producing an AC output, comprising a converter producing a converter output signal, wherein the converter has an input end and an output end, wherein the input end is connected to a power source. A control feedback circuit is used for delivering a composite voltage error signal to a pulse width modulator controller. There is an output inverter connected to the output end of the converter and communicating to the pulse width modulator controller for pulse width modulating the converter output signal and producing an inverter output signal at a fundamental frequency with a dc links signal at a multiple of the fundamental frequency, wherein the dc links signal tracks an envelope of the inverter output and is offset from the inverter output by a dc term.

Additionally, an object includes the dc links tooth modulator, further comprising an offset generator producing the dc term.

An object includes comprising an EMI/RF filter section connecting to the inverter output signal.

Another object is the dc links tooth modulator, wherein the inverter is a DC-AC inverter.

Yet another object is the dc links tooth modulator, wherein the system is under a no-load condition and the output signal remains at a low fixed level until a load is re-established.

An object includes wherein the output inverter is selected from the group consisting of thyristor type inverters and IGBT based output inverters.

One object is a dc links tooth modulation topology for a poly-phase AC output, comprising a converter producing a converter output signal, wherein the converter has an input end and an output end, wherein the input end is connected to a power source, and wherein a voltage sensor measures a voltage feedback signal. An inverter is connected to the output end of the converter with a pulse width modulator controller for pulse width modulating the converter output signal and producing an inverter output. There is a control feedback circuit delivering a composite voltage error signal to the pulse width modulator controller, wherein the composite voltage error signal comprises a first feedback signal proportional to the inverter output summed with the voltage feedback signal, and wherein the inverter output is an AC signal at a fundamental frequency with a dc links signal at a multiple of the fundamental frequency offset by a dc term. Also, further comprising a switch, wherein the switch connects to a reference generator to produce the inverter output signal. And also including an offset generator, wherein the offset generator produces the dc term.

An object includes the dc links tooth modulation topology, wherein the feedback signal proportional to the inverter output is produced by the process of taking an absolute value of the inverter output signal to produce a positive output signal, inverting the positive output signal to produce an inverted output signal, and summing the inverted output signal with a dc level to produce a tooth modulated signal.

In addition, the dc links tooth modulation topology, further comprising an imbalance limiter summed to the voltage feedback signal.

An object of the invention is a power conditioning system, comprising a power source, a dc-dc converter producing a dc output signal, wherein the dc-dc converter has an input end and an output end, and wherein the input end is connected to the power source. An output inverter is connected to the output end of the dc-dc converter for pulse width modulating the dc output signal and producing an inverter output voltage at a fundamental frequency. There is a control loop feedback signal connecting to the output inverter, wherein the control loop feedback signal is proportional to the inverter output voltage, and wherein a dc link voltage is a multiple of the fundamental frequency.

In addition, the power conditioning system, wherein the dc-dc converter comprises a dc capacitor connected parallel to the power source, a plurality of power switches connected parallel to the dc capacitor, a high frequency step up transformer connected to the plurality on a first side, a rectifier section connected to a second side of the transformer, and a filter section connected to the rectifier section.

There are currently no similar commercial devices in the marketplace that employ any form of DC links modulation scheme as described herein, although there are some power factor (PF) correction type control schemes, but these are different in purpose and function. Such devices do not pertain to the DC link voltage modulation scheme described herein.

Other objects, features and advantages are apparent from description in conjunction with the accompanying drawings.

BRIEF DESCRIPTION OF THE FIGURES

The present invention will be readily understood by the following detailed description in conjunction with the accompanying drawings, wherein like reference numerals designate like structural elements, and in which.

DESCRIPTION OF THE PREFERRED EMBODIMENT

The foregoing description of the preferred embodiment of the invention has been presented for the purpose of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

Figure 1:
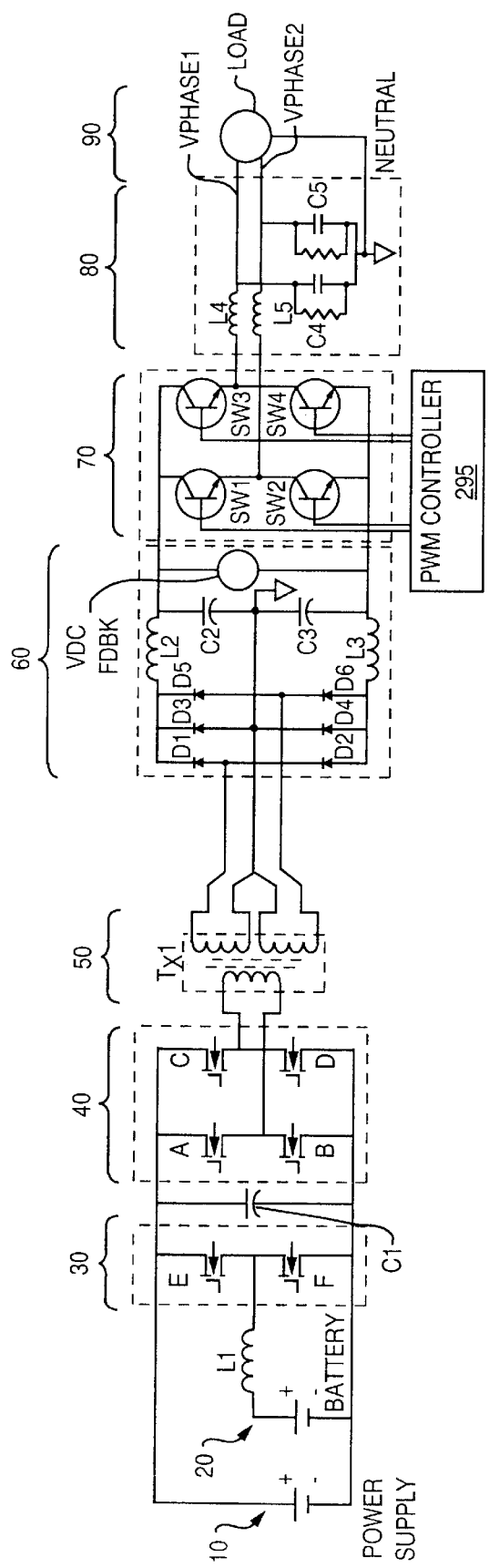
FIG. 1 schematic perspective showing the power source, DC-DC converter, and inverter stage FIG. 2 control loop diagram of the main DC/DC power converter control loop feedback circuits FIG. 3 control loop diagram of the main DC/DC power converter control loop feedback circuits with exploded view of signals at each section

Referring to FIG. 1, a simplified schematic of the invention, as applied to a single (split) phase PWM power inverter, is illustrated. One embodiment of the invention is a single phase three wire (240/120VAC) PWM inverter for residential, commercial, industrial, or military applications, fed by a regulated output DC-DC converter. In one application, the DC-DC converter is a quasi resonant H-bridge fed by a Fuel Cell and/or battery DC voltage source input.

In this illustration, the power source 10 is a fuel cell, which provides power to the main DC/DC converter switches 40, and to the battery DC/DC converter switches 30. The battery 20, such as a 48 V battery, and battery DC/DC converter 30 and L1 are used to store bulk energy for fuel cell startup, output load transients, and also to absorb current ripple (120 Hz in this case) thereby isolating the fuel cell 10 from harmful ripple.

An AC power source with a rectifier is another embodiment for a power source. In addition, the DC-DC converter can be a buck converter. The H-bridge is more applicable in cases requiring isolation, such as fuel cells, whereas a buck converter is more applicable for high input volts either rectified AC or DC or as a boost for low input volts (rectified AC or DC). And, while illustrating a single phase embodiment for ease of understanding the inventive subject matter, poly-phase systems are used encompassing the present scheme. Other power sources and configurations are within the scope of the invention and known to those skilled in the art.

The main DC/DC converter section consists of DC capacitor C1, power switches 40, transformer 50, and a rectifier/filter section 60. The rectifier/filter section 60 contains rectifier diodes D1–D6, and passive filter components C2, C3, L2, and L3. As described herein, the transformer 50 can be a high frequency step-up transformer.

The output PWM inverter consists of power switches 70, SW1-SW4, and an output PWM filter 80, having components L4, L5, C4, C5. The outputs Vphase1 and Vphase2 are connected to the load 90, either as a stand alone voltage source (120/240VAC), or as a grid connected current source (240VAC). The load 90 as referenced herein can be actual load or a grid connection that interconnects a number of other power sources and loads. A voltage sensor is connected across C2 and C3 to produce the Vdc Fdbk signal.

Regulated DC power, stored in C2, C3, is fed to the output inverter 70, that pulse width modulates the DC power, such that regulated sinusoidal AC power is fed to the PWM filters 80. In one embodiment the PWM Controller 295 controls the switches SW1, SW2, SW3, and SW4 to produce the desired AC signal. The primary function of the output PWM filter 80 is to prevent inverter switching ripple (PWM carrier) from coupling to the load 90, thereby allowing the PCU to provide high quality output power to the loads 90.

As the present invention has significant less PWM output voltage ripple and reduced high frequency harmonics than the prior art designs, EMI/RF filtering provides an extremely low noise power system.

Figure 2:
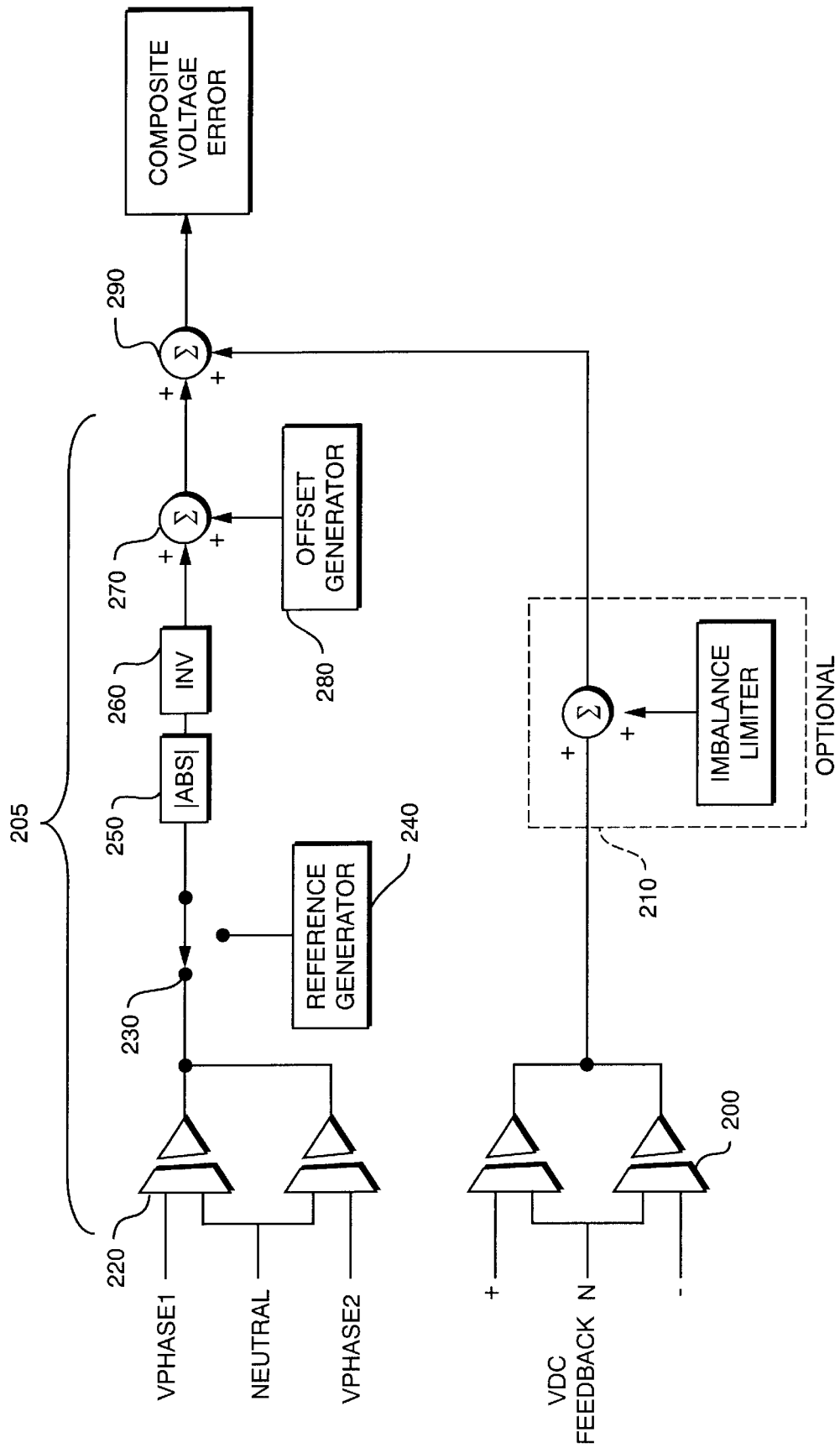

FIG. 2 is a control loop diagram of the main DC/DC power converter control loop feedback circuits, from which the tooth modulator effect is derived. The main DC/DC converter is essentially controlled as a closed loop voltage regulator, wherein DC voltage feedback, Vdc Fdbk, from across C2 and C3, is connected to an isolation amplifier 200, where the difference is scaled, filtered and summed with a tooth modulation signal that is subsequently connected to the DC/DC converter PWM controller as an error signal, Composite Voltage Error.

Optionally, a DC voltage imbalance limiter circuit 210 may be used to detect an imbalance in the voltage distribution across C2 and C3, and add a DC correction term to the DC voltage feedback signal Vdc Fdbk from differential amplifier 200, thereby decrementing the voltage error signal and allowing the output DC voltage to sag. The main purpose of this circuit is to prevent large imbalances in DC voltage (C2 versus C3) that may occur during certain fault conditions such as a short circuited load on only one phase of the output inverter.

The tooth modulator circuits 205 serve to create a composite tooth modulation signal that is subsequently summed with the DC voltage feedback Vdc Fdbk (from amplifier 200) at summer 290. The tooth modulator waveform adjusts the Composite Voltage Error signal, which causes the output DC voltages to follow the envelope of the tooth modulator input signal from the difference of Vphase1 and Vphase2, or the internally generated reference signal from the reference generator 240.

The line-line AC voltage feedback Vphase1 and Vphase2 via isolation amplifiers 220, or a synthesized AC voltage from the internal reference generator 240, is connected by the modulation select switch 230. The output of select switch 230 is converted to an absolute value 250, and is subsequently inverted, scaled and filtered 260. The resulting signal is then summed 270 with the output of the offset/gain generator 280. The offset generator 280 is a DC term that determines the voltage difference between the AC output voltage to the load 900, and the "tooth modulated" DC voltage present at C2 and C3, Vdc Fdbk. The output of the summing junction 270 is then connected to summing junction 290, where it is summed with the DC bus voltage feedback signal, Vdc Fdbk. The resulting output is a Composite Voltage Error signal that is connected to the main DC/DC PWM controller circuit 295 as the voltage feedback signal for closed loop operation.

Figure 3:
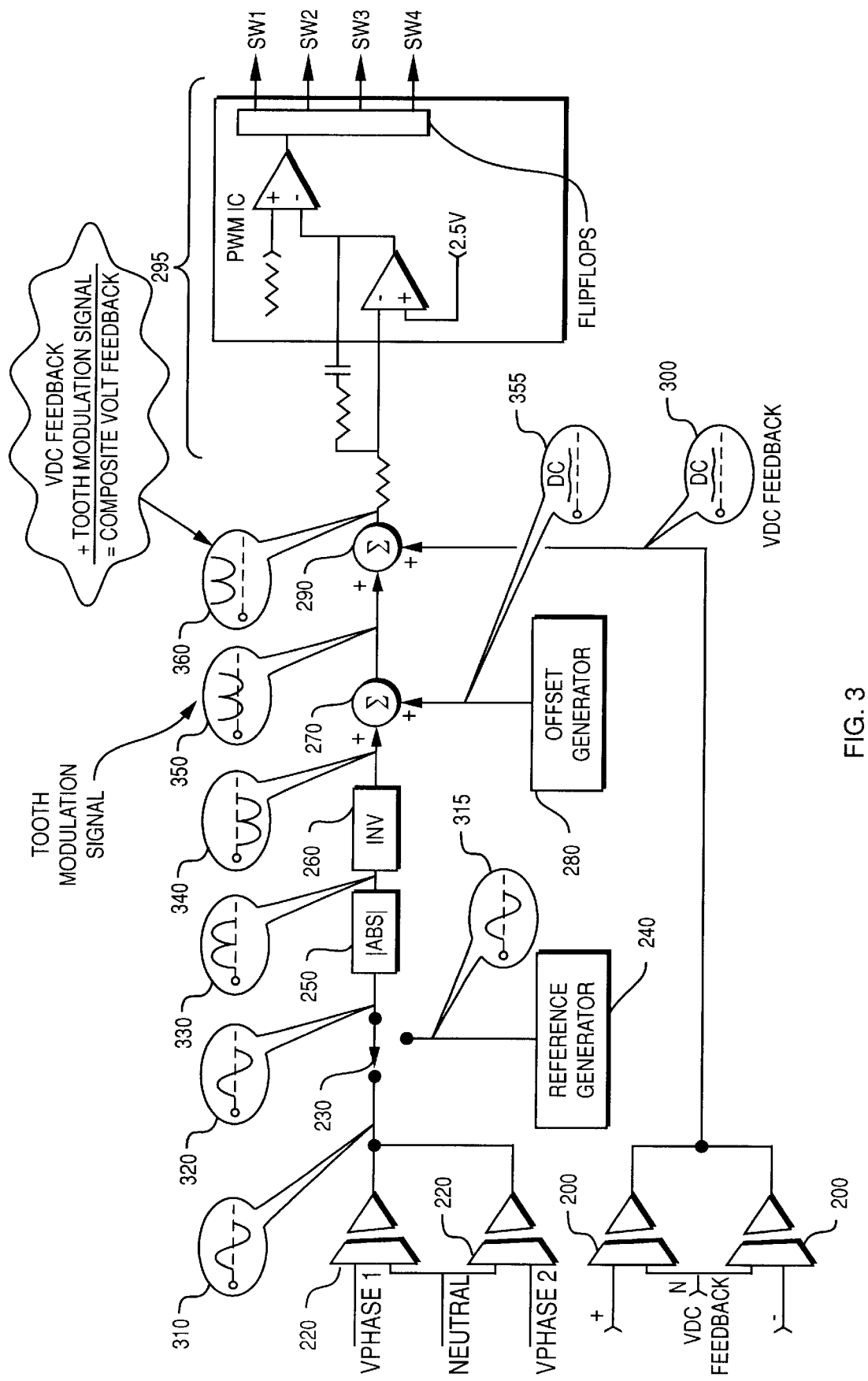

FIG. 3 is a further extrapolation of FIG. 2, further demonstrating the relevant signals at various junctions. The Vdc Fdbk signal from across C2 and C3 is applied to the isolation amplifier 290 and the resultant DC signal 300 is applied to the summing junction 290.

The line to line signals Vphase1 and Vphase2 go through the isolation amplifiers 220 and an AC sinusoidal signal 310 results. In one embodiment the AC signal 320 goes through a switch 230 and is converted to the absolute value signal 330 and then an inverted signal 340. The inverted signal 340 is summed with a DC signal 355 from the offset generator 280. The resulting Tooth Modulation signal 350 is generated that shifts the AC signal.

The Vdc Fdbk signal 300 is summed with the Tooth Modulation signal 350 to produce the Composite Voltage Error feedback signal 360. The Composite Voltage Error feedback signal 360 is applied to a PWM controller 295 that pulse width modulates the output PWM inverter 70 to produce the output signals Vphase1 and Vphase2.

In lieu of the AC signal 310 from Vphase1 and Vphase2, the modulator switch 230 can be switched to the reference generator 240 to generate an AC signal 315 that serves as the input signal 320 to the subsequent processing to produce the Composite Voltage Error signal.

In one embodiment, the main DC/DC converter functions as a phase shifted resonant converter controlled by either a PWM integrated circuit, or a digital signal processor (DSP) controller. Such PWM circuits are well known to those skilled in the art. The output of the main DC/DC converter is a center tapped, balanced, and regulated DC voltage that is stored in C2 and C3.

Figure 4A:
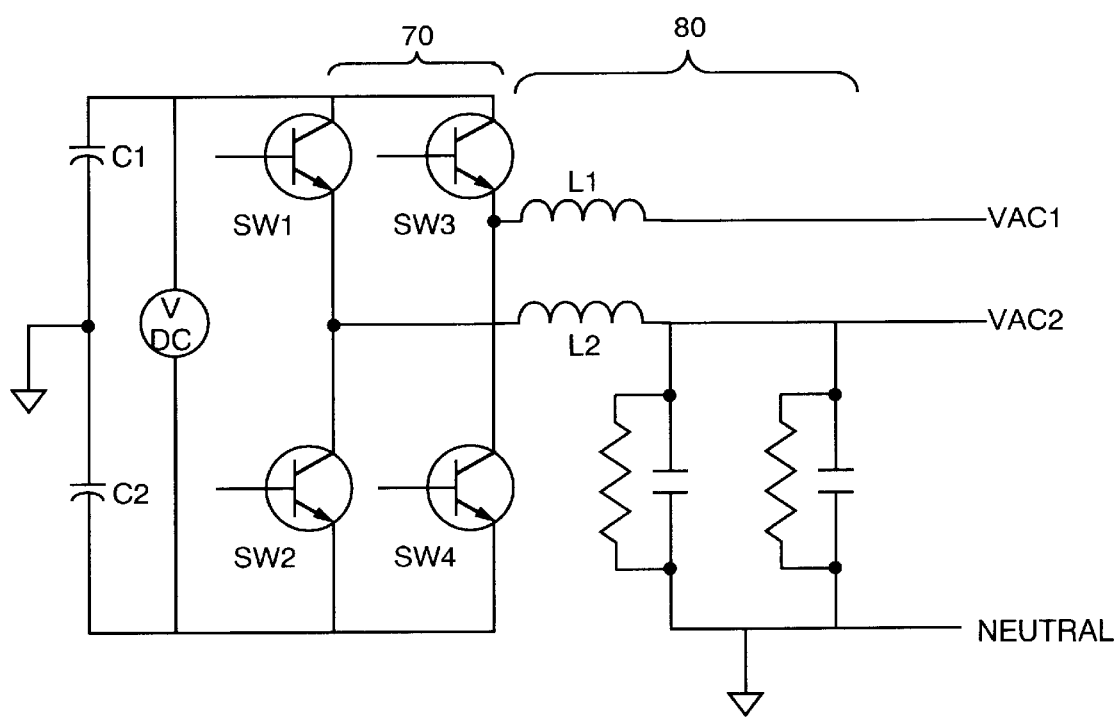
FIG. 4a illustrates the output PWM inverter with signals denoted FIG. 4b prior art diagram showing the AC voltage signals and the DC voltage levels FIG. 4c prior art diagram showing the voltage signals for inductor L1
Figure 4B:
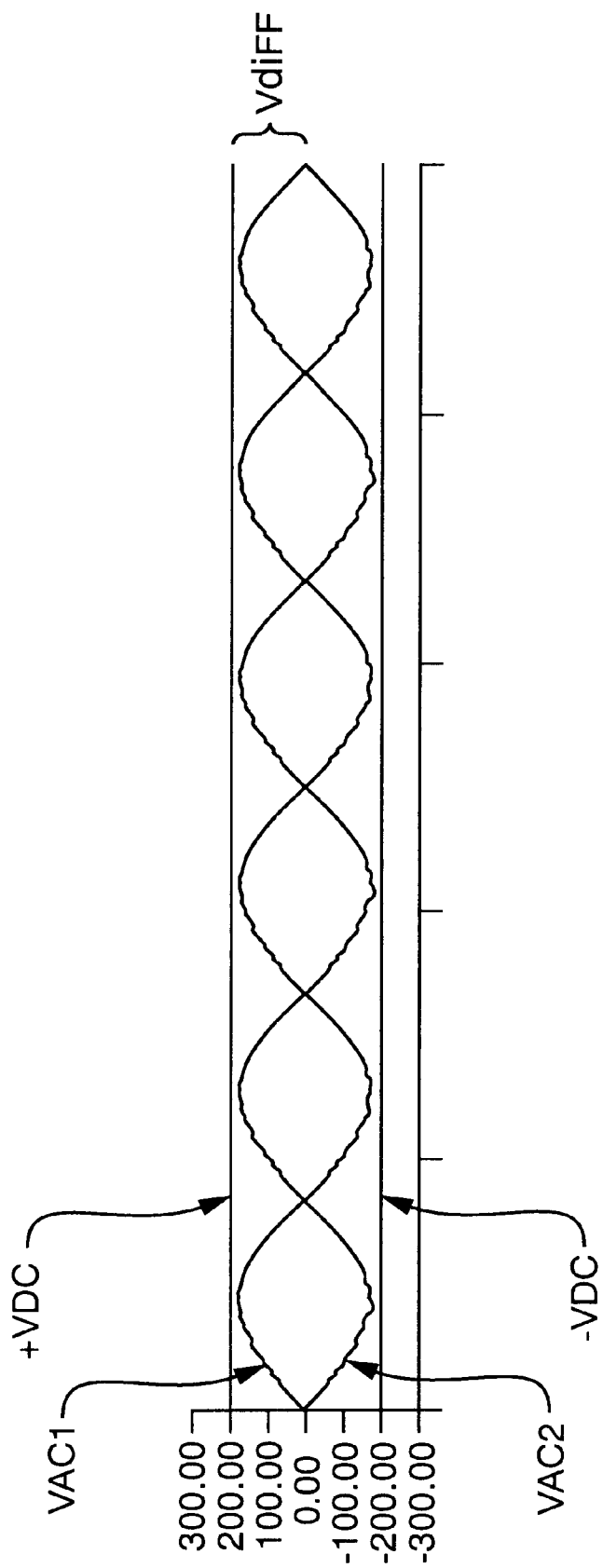
FIG. 4d prior art diagram showing the voltage signals for capacitor C3
Figure 4C:
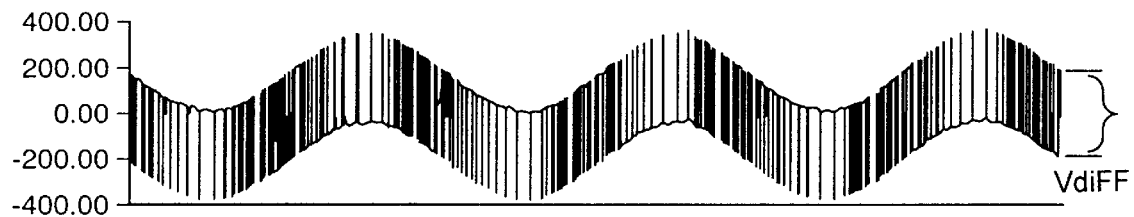
Figure 4D:
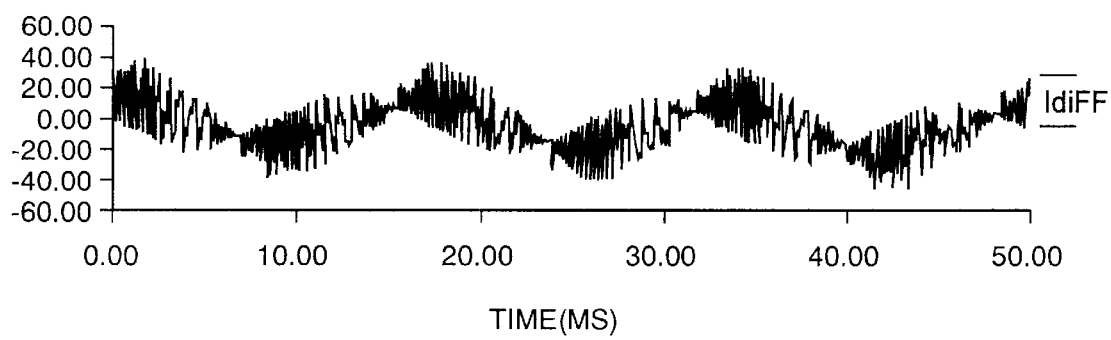

FIG. 4a is a typical output PWM inverter section 70, 80 and various prior art waveforms are shown in FIGS. 4b–4d. FIG. 4b shows the AC signals Vac1 and Vac2 modulating between the +Vdc and −Vdc signals. FIG. 4c illustrates the voltage across at the inductor L1, showing the voltage amplitude response with the greatest voltage difference at the zero crossings. As indicated, the voltage difference at the zero crossing is approximately −200 to +200 Volts. FIG. 4d shows the ripple current levels of on capacitor C3 demonstrating the switching ripple levels that must be handled by the associated components in the PWM output sections 70, 80. Looking at the same zero crossing point, the current difference is approximately 30 Amps. As explained herein, the greater the difference between the applied DC volts and the AC output volts, the greater the power loss, size, weight, and cost of the components needed to handle the ripple voltage levels.

Figure 5A:
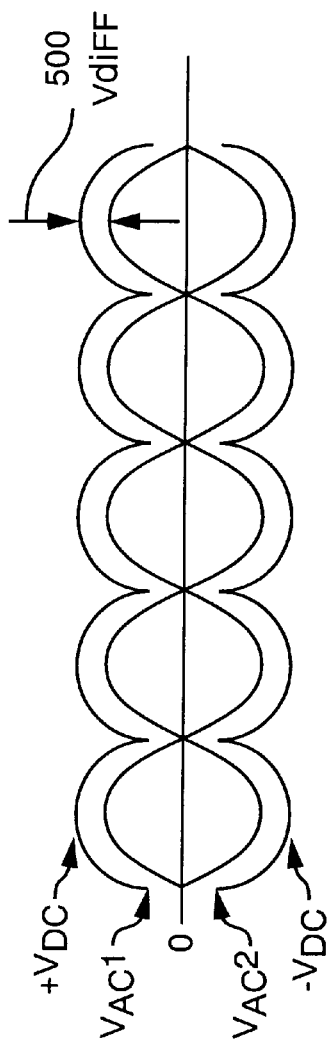
FIG. 5a AC voltage signals and the DC voltage levels for the dc links scheme (simplified)
Figure 5B:
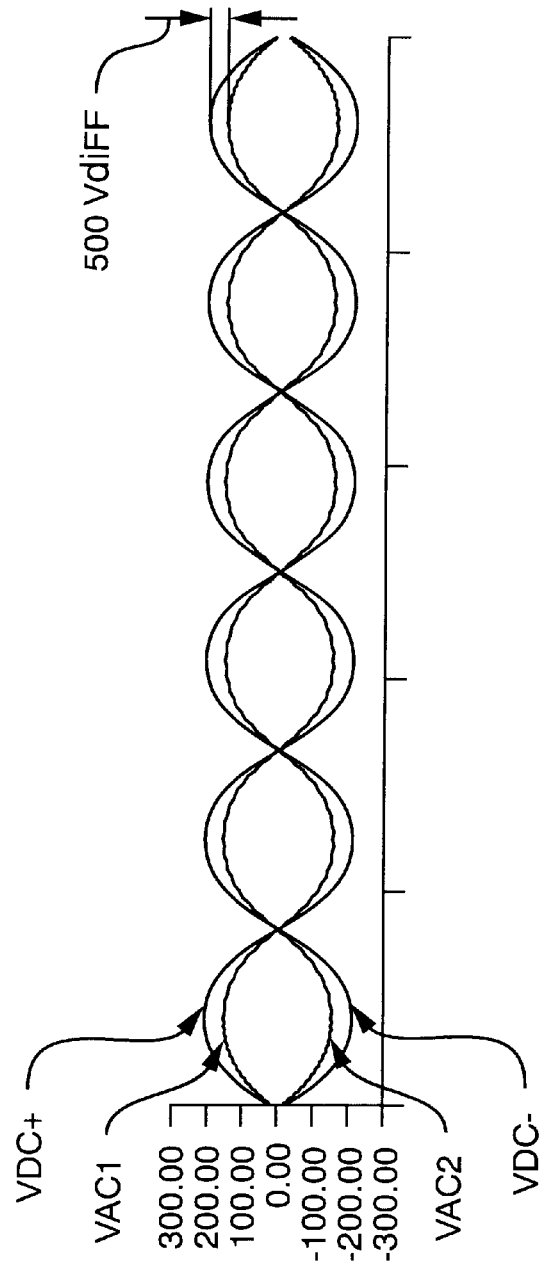
FIG. 5b AC voltage signals and the DC voltage levels for the dc links scheme (actual)
Figure 5C:
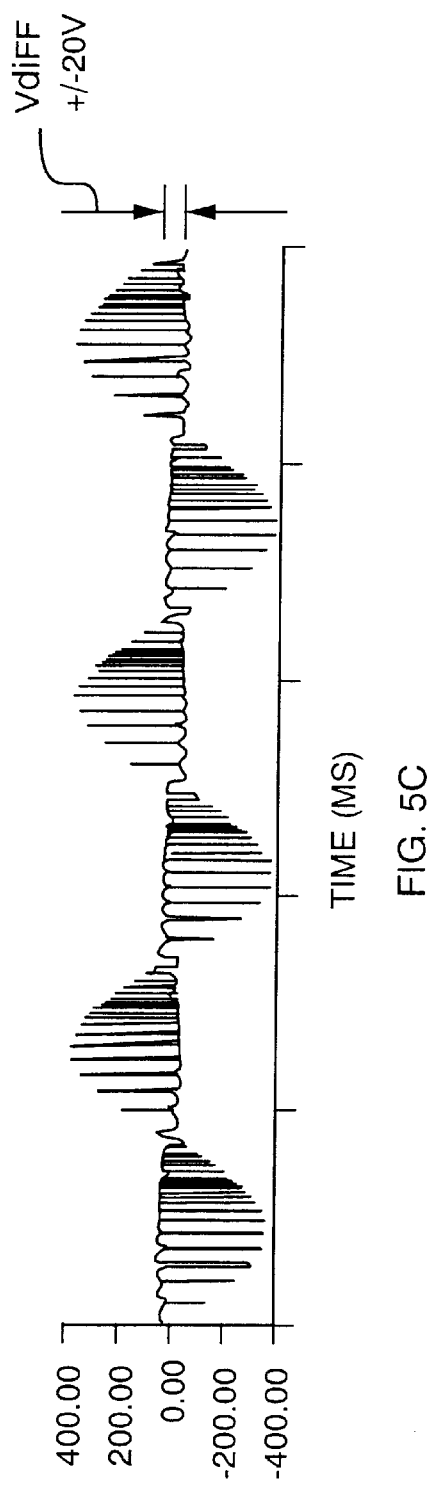
FIG. 5c voltage signals for inductor L1 illustrating the tooth modulation
Figure 5D:
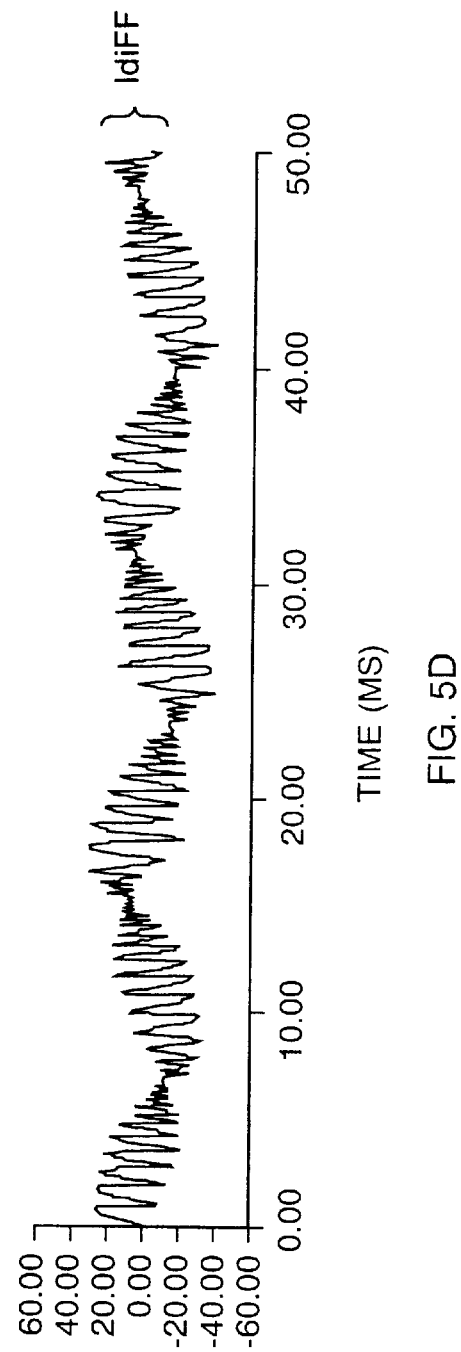
FIG. 5d voltage signals for capacitor C3 illustrating the tooth modulation

In distinction, the output signals from the present invention are shown in FIGS. 5a–5d. FIG. 5a is the theoretical response while FIG. 5b shows the modeled response. As compared to prior art FIG. 4b, the signal presented in FIG. 5a and FIG. 5b shows the DC voltage signals +Vdc and −Vdc tracking the AC signals Vac1 and Vac2 such that the difference between the DC and AC signal, Vdiff 500 at any point is appreciably smaller than the prior art. The output voltage signals across the inductor L1 and the currents of capacitor C3 are depicted in FIGS. 5c and 5d respectively. The much smaller voltage levels allow the components in the output sections 70, 80 to be designed for lower power loss levels. The lower filter power losses, thus permits the components to be smaller, lighter, and less expensive. The effect of this is to reduce the ripple voltage developed across the filter inductor by decreasing the difference between the switched DC voltage applied to the PWM filter by the inverter, and the actual desired output sinusoidal voltage. This vastly reduces inductor core losses, reduces filter cost, reduces inverter switch losses, and reduces DC-DC converter output HF rectifier losses.

Normally the DC-DC converter conditions and regulates power from an unregulated, or poorly regulated DC source to produce a tightly regulated DC output voltage for use by a conventional PWM output inverter. In a 240/120VAC 60 Hz application, such as occurs in a residential fuel cell power generation system, the output power (or DC current) as seen by the DC link occurs at a 120 Hz frequency. Typically, an output PWM filter (consisting of a passive LC circuit) is used to filter off the PWM inverter "switching ripple" thereby producing a "clean" sinusoidal output. Voltage and consequently power loss developed across the PWM filter inductor increases as a function of the difference between the DC link volts and the output voltage. Thus, inductor losses peak near the zero crossing of the output sinusoidal voltage.

Figure 6A:
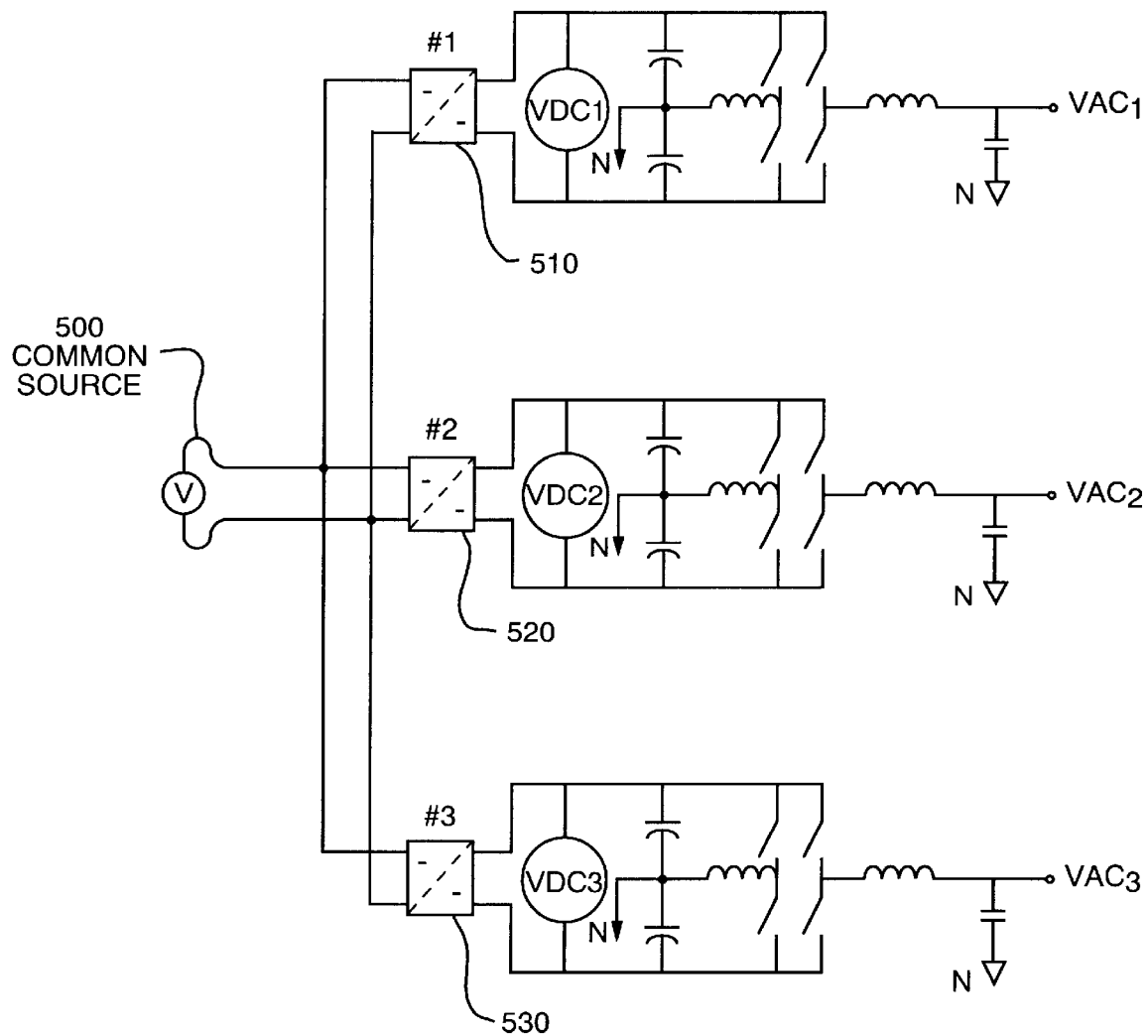
FIG. 6a diagrammatic perspective of an isolated three phase DC-DC tooth modulator having a single voltage source and three independent tooth modulators FIG. 6b output three phase signal response for VAC1, VAC2, and VAC3
Figure 6B:
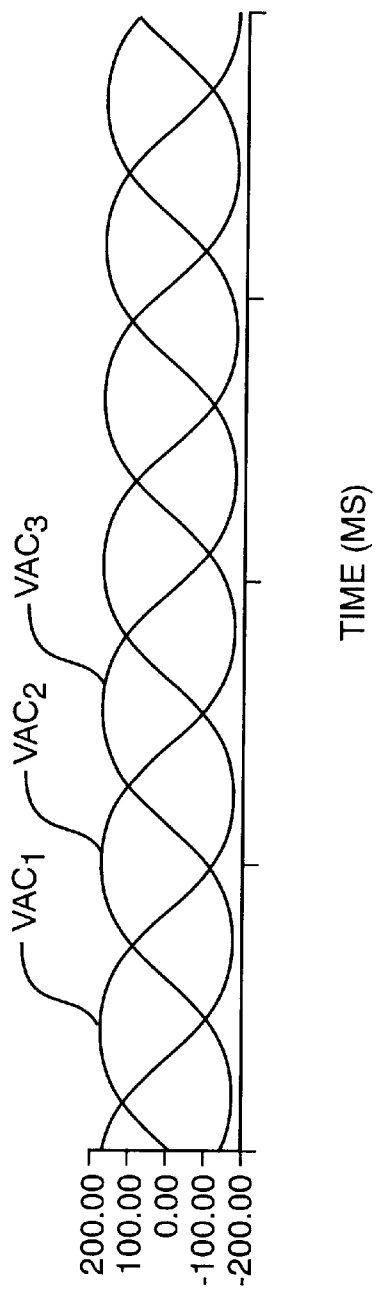
FIG. 6c individual response for VAC1 showing dc links voltage following the single phase FIG. 6d individual response for VAC2 showing dc links voltage following the single phase FIG. 6e individual response for VAC3 showing dc links voltage following the single phase FIG. 7a isolated center tapped single tooth modulator for three phase system FIG. 7b three phase response showing the dc links voltage tracking the envelope of the three phase signal FIG. 8a isolated center tapped dual tooth modulator for three phase system FIG. 8b three phase response showing the dc links voltage tracking the envelope of the three phase signal

Referring to FIG. 6a, three phase tooth modulator system is depicted for generating a three phase output, VAC1, VAC2, and VAC3 from a common source 500. Three individual isolated DC-DC tooth modulators 510, 520, 530 are each connected to the common source 500 and each modulator 510, 520, 530, each produce a single phase output VAC1, VAC2, VAC3 respectively. In this embodiment, each phase is equipped with a separate DC supply (tooth modulator), and each individual phase PWM inverter may consist of a single ½ bridge, or preferably an H-bridge.

Figure 6C:
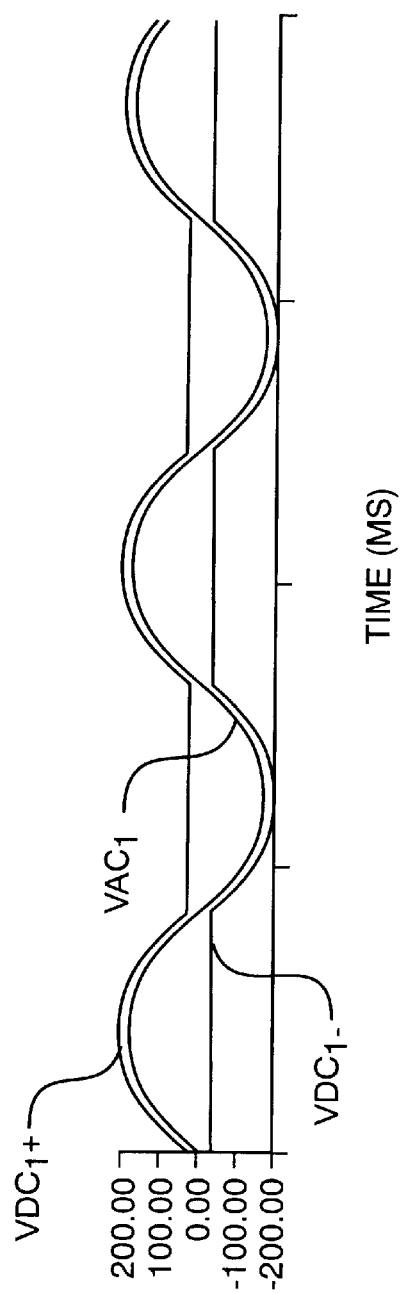
Figure 6D:
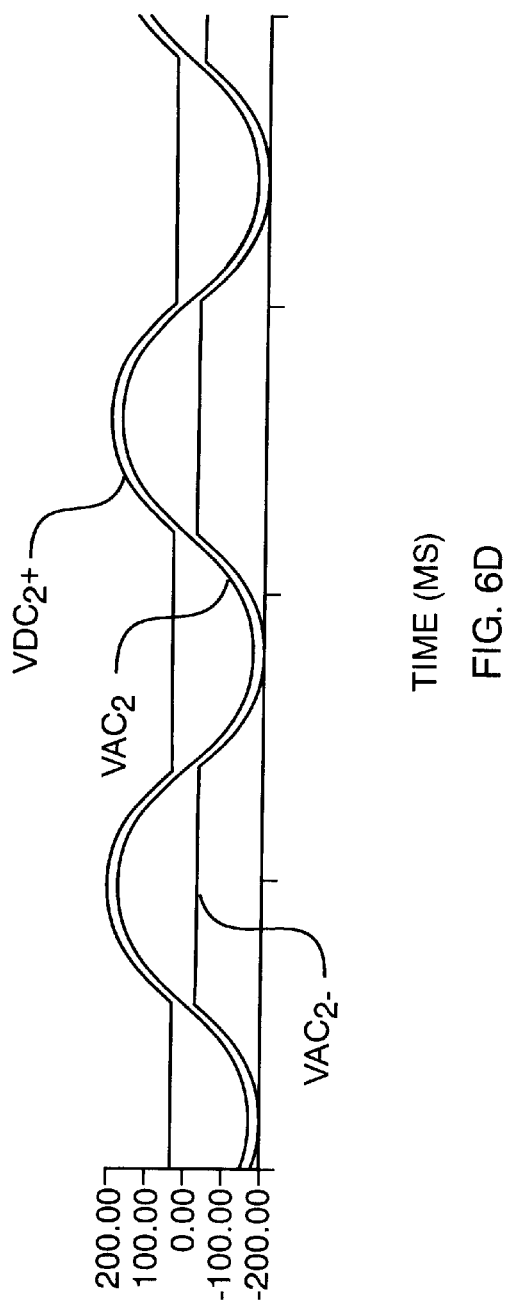
Figure 6E:
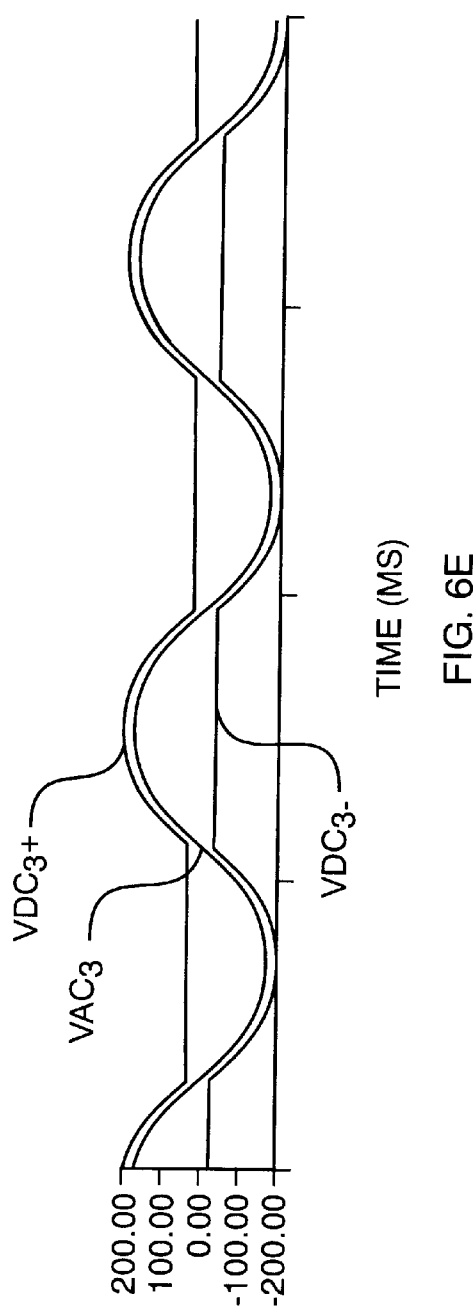

FIG. 6a is the three phase AC sinusoid output with the zero crossings for each particular phase. FIGS. 6c–6e illustrate the individual responses for each phase, VAC1, VAC2, and VAC3. For each phase, the dc links voltage tracks the AC envelope as indicated so that the voltage difference is minimized as compared to prior art designs. As described herein, the envelope refers to the upper and lower envelope created by the AC signal, whether signal phase or polyphase. An upper and lower dc links response, Vdc+ and Vdc− follows the envelope offset by some dc value.

Figure 7A:
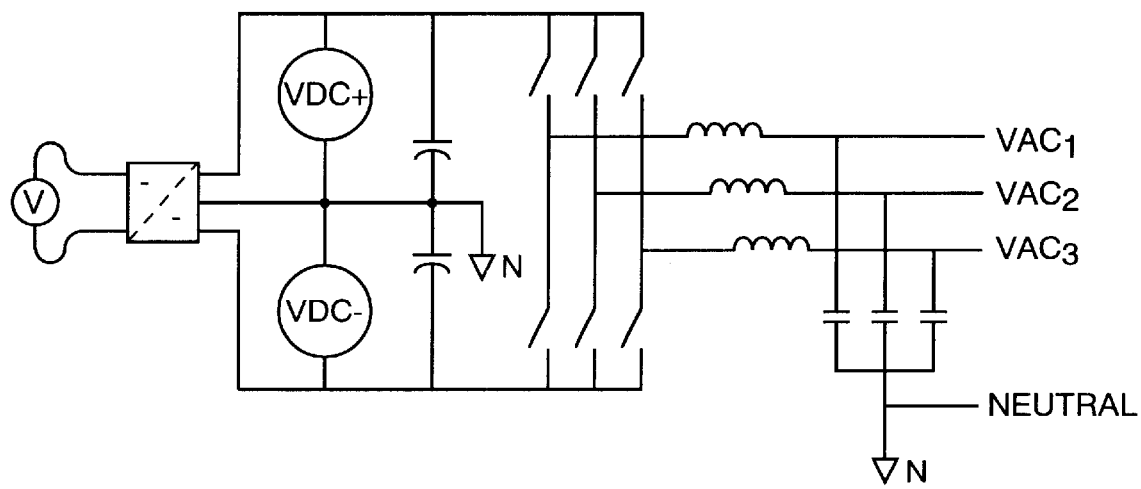
Figure 7B:
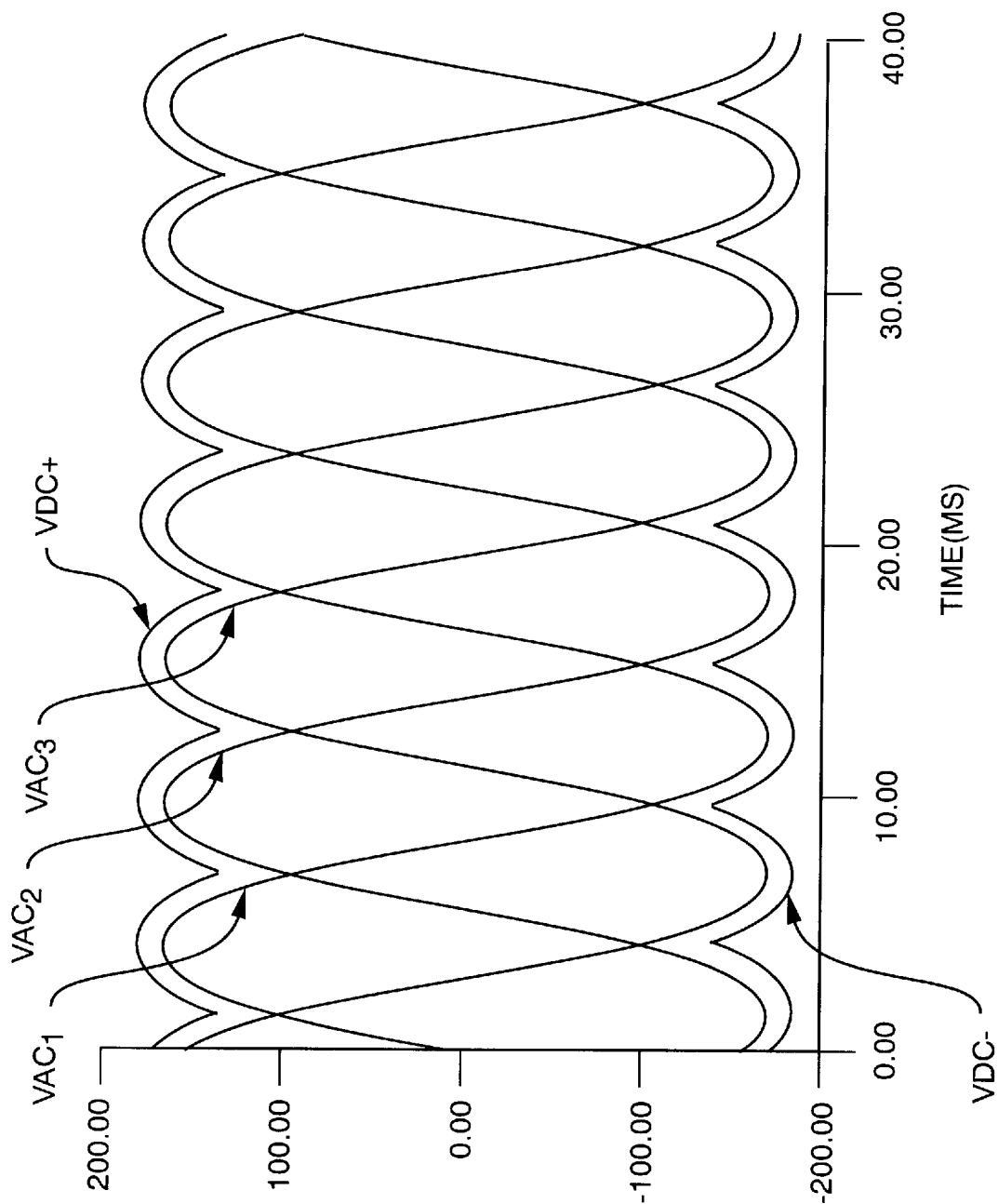
Figure 8A:
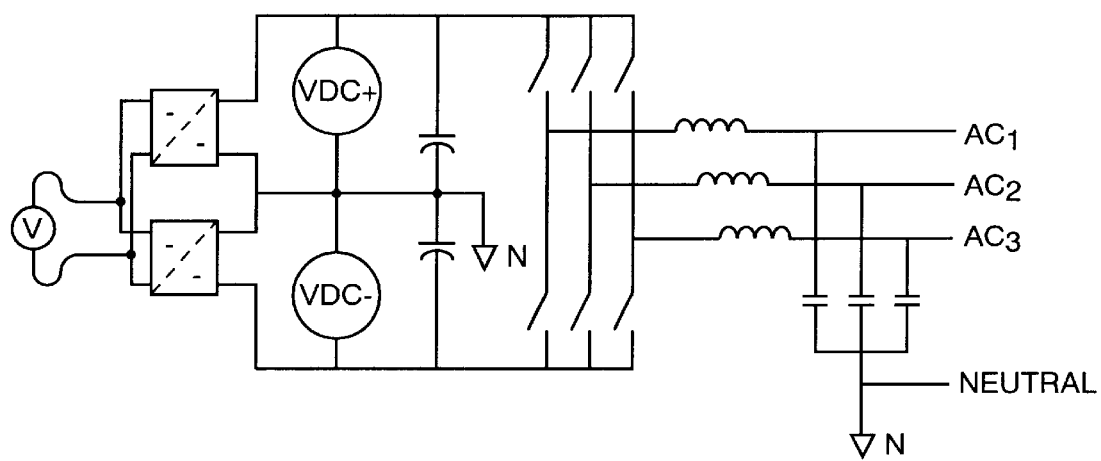
Figure 8B:
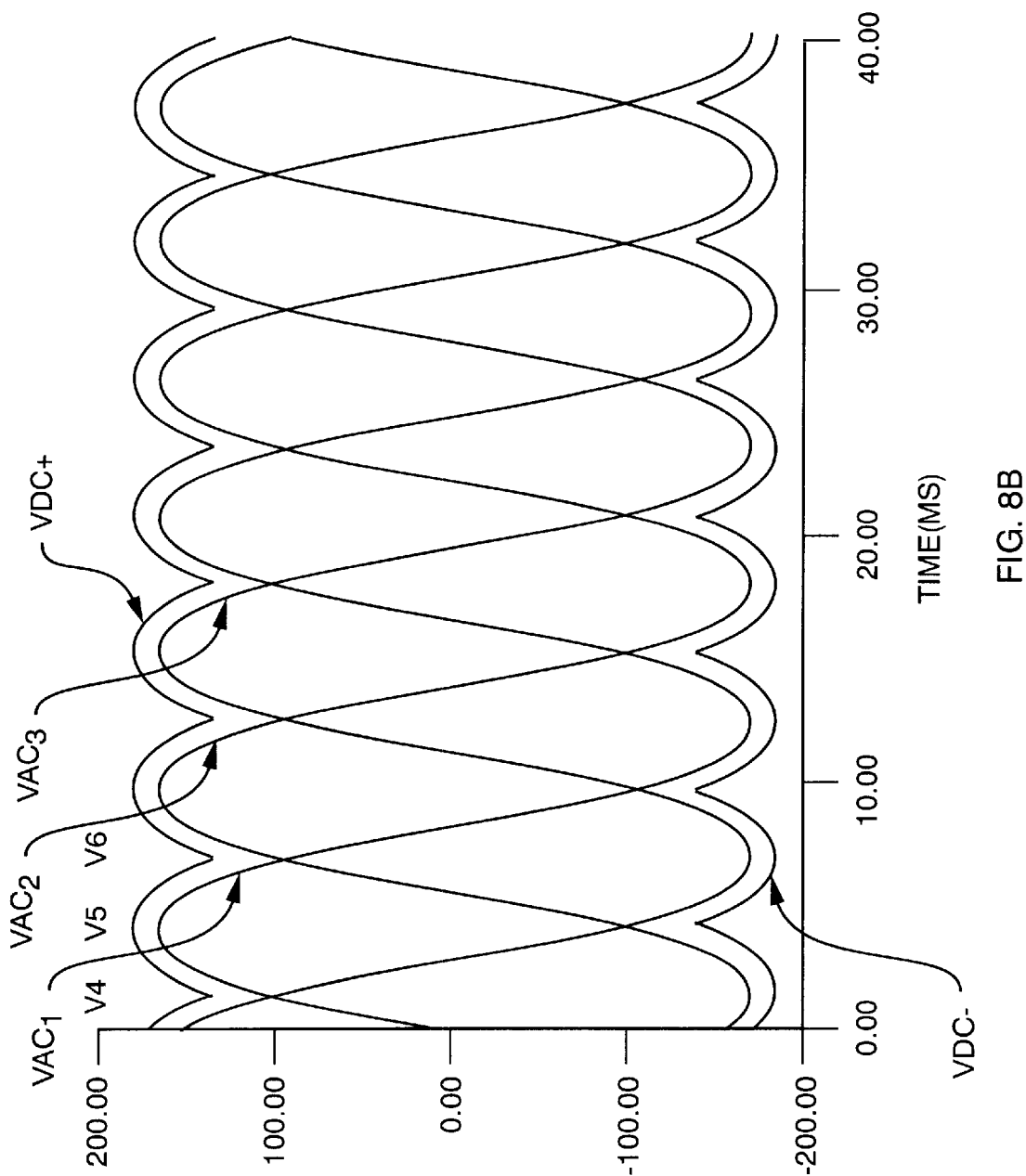

Other three phase embodiments are shown in FIGS. 7a and 8a. In the three phase embodiment is shown in FIG. 8a, where all three PWM phases are fed from a common DC supply consisting of two series connected tooth modulators. In this case, each tooth modulators controls ½ of the DC link voltage supplied to the inverter switches. The upper DC supply, or top, tooth modulator will track the sum of the positive ½ of the three phase voltages line to neutral. The lower DC supply, or bottom, tooth modulator will track the sum of the negative ½ of the three phase voltages line to neutral. Each tooth modulator thereby supplies a DC with either 300 Hz or 360 Hz content. The responses, FIGS. 7b and 8b are substantially similar in both embodiments.

In a preferred embodiment of the present invention, the DC-DC converter control takes a feedback signal proportional to the inverter output voltage. This feedback is "summed" into the primary DC-DC volts command thereby causing the dc bus/link voltage to vary at a multiple of the output fundamental frequency. In a single phase application with a fundamental frequency of 60 Hz, the multiple for the dc link is two, and in effect, this causes the DC link to become a 120 Hz voltage with a dc offset.

Timing of this signal is such that the DC link volts approaches its lowest point (offset from zero by the DC term) as the AC output volts crosses the zero threshold, and the DC link approaches it's peak as the AC output volts approaches it's peak voltage. The AC output and the DC links waveforms are offset by the DC term that is selected to be high enough to allow for fluctuations in the AC output and low enough to optimize the advantages described herein. In a preferred embodiment the DC offset was 30 volts, however other levels are well within the scope of the invention.

The invention is susceptible of many variations, all within the scope of the specification, figures, and claims. The preferred embodiment described here and illustrated in the figures should not be construed as in any way limiting.

No warranty is expressed or implied as to the actual degree of safety, security or support of any particular specimen of the invention in whole or in part, due to differences in actual production designs, materials and use of the products of the invention.

The objects and advantages of the invention may be further realized and attained by means of the instrumentalities and combinations particularly pointed out in the appended claims. Accordingly, the drawing and description are to be regarded as illustrative in nature, and not as restrictive.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

What is claimed is:

1. A dc links tooth modulator for producing an AC output, comprising:
   a converter producing a converter output signal, wherein said converter has an input end and an output end, wherein said input end is connected to a power source;
   a control feedback circuit delivering a composite voltage error signal to a pulse width modulator controller;
   an output inverter connected to said output end of said converter and communicating to said pulse width modulator controller for pulse width modulating said converter output signal and producing an inverter output signal at a fundamental frequency with a dc links signal at a multiple of said fundamental frequency, wherein said dc links signal tracks an envelope of said inverter output and is offset from said inverter output by a dc term.

2. The dc links tooth modulator according to claim 1, further comprising an offset generator producing said dc term.

3. The dc links tooth modulator according to claim 1, further comprising an EMI/RF filter section connecting to said inverter output signal.

4. The dc links tooth modulator according to claim 1, wherein said inverter is a DC-AC inverter.

5. The dc links tooth modulator according to claim 1, wherein under a no-load condition said output signal remains at a low fixed level until a load is re-established.

6. The dc links tooth modulator according to claim 1, wherein said output inverter is selected from the group consisting of thyristor type inverters and IGBT based output inverters.

7. A dc links tooth modulation topology for a poly-phase AC output, comprising:
   a converter producing a converter output signal, wherein said converter has an input end and an output end, wherein said input end is connected to a power source, and wherein a voltage sensor measures a voltage feedback signal;
   an inverter connected to said output end of said converter with a pulse width modulator controller for pulse width modulating said converter output signal and producing an inverter output;
   a control feedback circuit delivering a composite voltage error signal to said pulse width modulator controller, wherein said composite voltage error signal comprises a first feedback signal proportional to said inverter output with said voltage feedback signal, and wherein said inverter output is an AC signal at a fundamental frequency with a dc links signal at a multiple of said fundamental frequency offset by a dc term.

8. The dc links tooth modulation topology according to claim 7, wherein a plurality of said dc links tooth modulation topology are connected in parallel to produce said poly-phase AC output from said power source.

9. The dc links tooth modulation topology according to claim 7, further comprising a switch, wherein said switch connects to a reference generator to produce said inverter output signal.

10. The dc links tooth modulation topology according to claim 7, further comprising an offset generator, wherein said offset generator produces said dc term.

11. The dc links tooth modulation topology according to claim 7, wherein said feedback signal proportional to said inverter output is produced by the process of taking an absolute value of said inverter output signal to produce a positive output signal; inverting said positive output signal to produce an inverted output signal; summing said inverted output signal with a dc level to produce a tooth modulated signal.

12. The dc links tooth modulation topology according to claim 7, further comprising an imbalance limiter summed to said voltage feedback signal.

13. A power conditioning system, comprising:
   a power source;
   a dc-dc converter producing a dc output signal, wherein said dc-dc converter has an input end and an output end, wherein said input end is connected to said power source;
   an output inverter connected to said output end of said dc-dc converter for pulse width modulating said dc output signal and producing an inverter output voltage at a fundamental frequency;
   a control loop feedback signal connecting to said output inverter, wherein said control loop feedback signal is proportional to said inverter output voltage, and wherein a dc link voltage is a multiple of said fundamental frequency.

14. The power conditioning system according to claim 13, wherein said dc-dc converter comprises a dc capacitor connected parallel to said power source, a plurality of power switches connected parallel to said dc capacitor, a high frequency step up transformer connected to said plurality on a first side; a rectifier section connected to a second side of said transformer, and a filter section connected to said rectifier section.

15. The power conditioning system according to claim 13, further comprising an offset generator producing said dc term.

16. The power conditioning system according to claim 13, further comprising an EMI/RF filter section connecting to said inverter output signal.

17. The power conditioning system according to claim 13, wherein said inverter is a DC-AC inverter.

* * * * *